(12) United States Patent
Tao et al.

(10) Patent No.: US 11,289,990 B2
(45) Date of Patent: Mar. 29, 2022

(54) LINEAR VIBRATION MOTOR

(71) Applicant: AAC Technologies Pte. Ltd., Singapore (SG)

(72) Inventors: Feng Tao, Shenzhen (CN); Fanghua Ling, Shenzhen (CN); Mengxun Shi, Shenzhen (CN); Xiaofeng Pu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 198 days.

(21) Appl. No.: 16/699,740

(22) Filed: Dec. 2, 2019

(65) Prior Publication Data

US 2020/0212778 A1 Jul. 2, 2020

(30) Foreign Application Priority Data

Dec. 30, 2018 (CN) .......................... 201822279151.1

(51) Int. Cl.
*H02K 33/18* (2006.01)
(52) U.S. Cl.
CPC .................................... *H02K 33/18* (2013.01)
(58) Field of Classification Search
CPC ........ H02K 33/12; H02K 33/14; H02K 33/16; H02K 33/18; H02K 1/34; H02K 35/00; H02K 35/04; H02K 33/00; H02K 33/02; H02K 35/02
USPC ..................................................... 310/28, 35
See application file for complete search history.

(56) References Cited

FOREIGN PATENT DOCUMENTS

| CN | 106849581 A1 | 6/2017 |
| CN | 206524745 U | * 9/2017 |
| CN | 107332423 A1 | 11/2017 |
| JP | 2001046351 A | * 2/2001 |

OTHER PUBLICATIONS

Chen (CN 206524745 U) English Translation (Year: 2017).*
Hashimoto (JP 2001046351 A) English Translation (Year: 2001).*
PCT search report dated Jan. 2, 2020 by SIPO in related PCT Patent Application No. PCT/CN2019/110644 (5 Pages).

* cited by examiner

*Primary Examiner* — Tulsidas C Patel
*Assistant Examiner* — Robert E Mates
(74) *Attorney, Agent, or Firm* — W&G Law Group

(57) ABSTRACT

The present invention provides a linear vibration motor including a housing with a receiving space, a vibration unit placed in the receiving space, an elastic part suspending the vibration unit in the receiving space and a coil assembly fixed on the housing and driving the vibration of the vibration unit. The vibration unit includes a weight in which a pole plate is disposed for positioning a magnet. The pole plate includes a body part and a positioning protrusion extending from the body part. The magnet includes a positioning hole corresponding to the positioning protrusion. Compared with the related technology, the linear vibration motor of the invention has the advantages of simpler assembly, higher assembly precision and higher vibration reliability.

5 Claims, 4 Drawing Sheets

LINEAR VIBRATION MOTOR

FIELD OF THE PRESENT DISCLOSURE

The present disclosure relates to the field of electrical transducers, more particularly to a linear vibration motor in a mobile device, for converting electrical signals into tactile feedbacks.

DESCRIPTION OF RELATED ART

With the development of electronic technology, portable consumer electronic products, such as mobile phones, handheld game consoles, navigation devices or handheld multimedia entertainment devices are more and more popular. These electronic products generally use linear vibration motors to perform system feedback, such as phone call prompt, information prompt, navigation prompt, vibration feedback of game machines, etc. Such a wide range of applications requires that the vibration motor has excellent performance and long service life.

A linear vibration motor in a related technology includes a housing with a housing space, a vibration unit placed in the housing space, an elastic member suspending the vibration unit in the housing space and a coil assembly fixed to the housing for driving the vibration unit. The vibration unit includes a weight fixed with the elastic member, a ring-shaped pole plate embedded in the weight, and two magnets fixed by the pole plate.

However, in the related technology, during the process of assembling the magnets, the magnets and the pole plate need to be aligned with each other first, and the alignment work is easy to produce alignment deviation, which makes it difficult to ensure the assembly accuracy between the pole plate and the magnet, and makes the assembly difficult. In addition, the magnet is directly glued to the inner side of the pole plate, and the magnet is not supported by other means, which makes it easy to fall off during the vibration process. Accordingly, the reliability of the vibration of the linear vibration motor is affected.

Therefore, it is necessary to provide a new linear vibration motor to solve the above problems.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
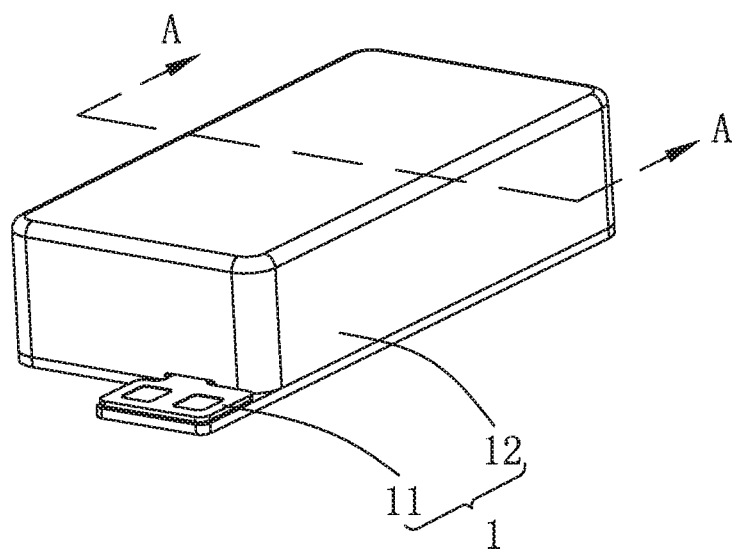
FIG. 1 is an isometric view of a linear vibration motor in accordance with an exemplary embodiment of the present disclosure.
Figure 2:
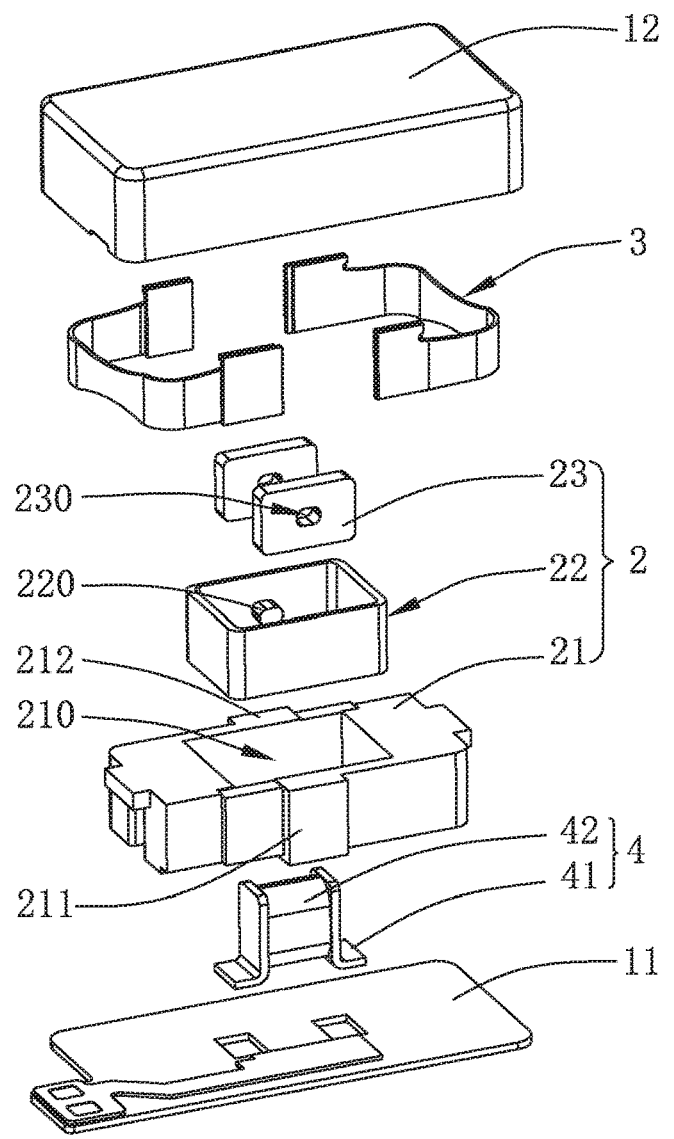
FIG. 2 is an exploded and isometric view of the linear vibration motor in FIG. 1.

Referring to FIGS. 1-2, the present disclosure provides a linear vibration motor 100, which includes a housing 1 with an accommodation space 10, a vibration unit 2, an elastic member 3 and a coil assembly 4.

The housing 1 includes a bottom plate 11 and an upper cover 12 engaging with the bottom plate 11 for enclosing the accommodation space 10 cooperatively.

Figure 3:
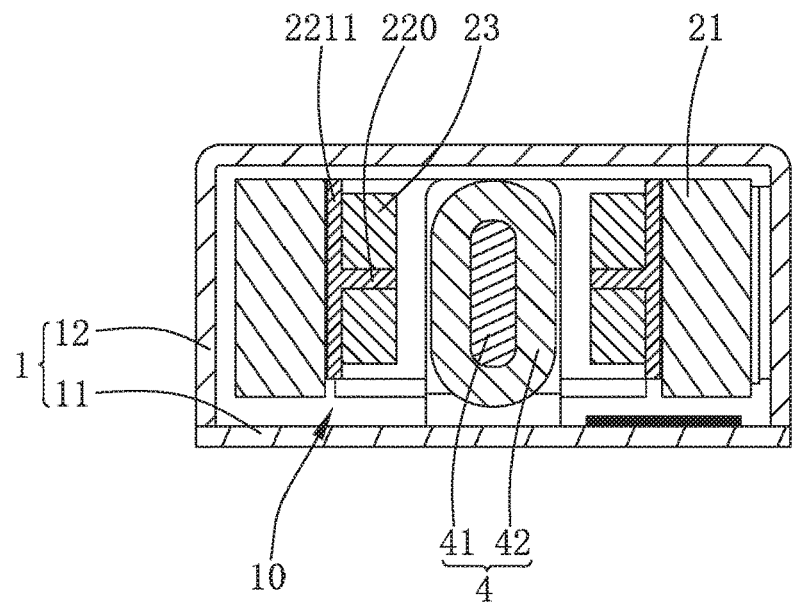
FIG. 3 is a cross-sectional view of the linear vibration motor, taken along line A-A in FIG. 1.
Figure 4:
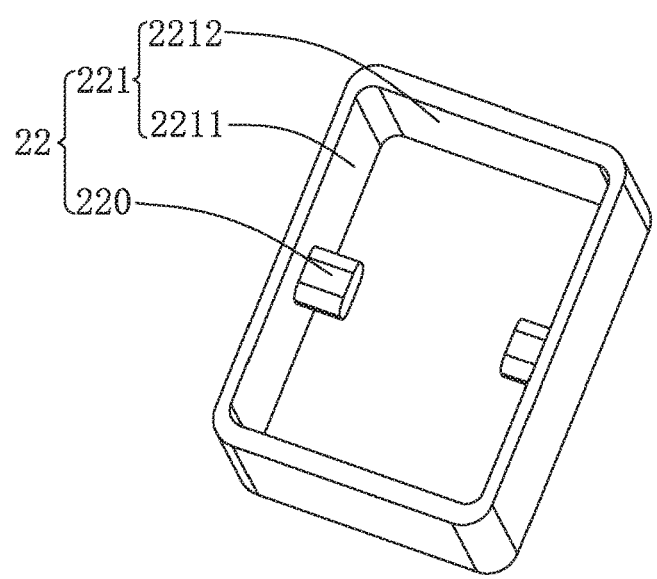
FIG. 4 is an isometric view of a pole plate of the linear vibration motor.

Referring to FIGS. 2-4, the vibration unit 2 is placed in the accommodation space 10. In the embodiment, the vibration unit 2 is supported and suspended in the accommodation space 10 by the elastic member 3, and the coil assembly 4 is used to drive the vibration unit 2 to vibrate.

Specifically, the vibration unit 2 includes a weight 21 fixedly supported by the elastic member 3 and having a through hole 210, a pole plate 22 housed in the through hole 210 and a magnet 23 fixedly assembled with the pole plate 22. The coil assembly 4 is inserted in the through hole 210 and surrounds the magnet 23.

In the embodiment, the magnet 23 includes two pieces each respectively fixed on opposite sides of the pole plate 22.

The pole plate 22 includes a body part 221 fixed in the through hole 210 and a positioning protrusion 220 extending from the body part 221 towards the coil assembly 4. Specifically, the magnet 23 includes a positioning hole 230 for cooperatively engaging with the positioning protrusion 220. The positioning hole 230 of the magnet 23 engages with the positioning protrusion 220 by the means of surrounding the positioning protrusion 220 for connecting with the body part 221. The magnet 23 and the body part 221 are connected with each other by glue. The body part 221 is rectangular and has a long axis parallel to the vibration direction.

Further, the body 221 includes two long side walls 2211 parallel to the long axis thereof and two short side walls 2212 parallel to a short axis thereof. The two short side walls 2212 are opposite to each other. The positioning protrusions 220 is formed respectively by extending from the two long side walls 2211. In addition, the weight 21 includes a first wall 211 and a second wall 212 opposite to the first wall, both of the first and second walls extending long the long side walls 2211.

Of course, it should be noted that it is also feasible that the positioning protrusions are formed by extending from the short side walls 2212. The number of the positioning protrusions 220 is not limited to what is described, for example, the positioning protrusions 220 includes four pieces. Two of positioning protrusions are respectively arranged on two long side walls 2211 and the other two are respectively arranged on two short side walls 2212.

In the above structure, each of the magnet 23 is positioned by the engagement between the positioning protrusions 220 and the positioning holes 230 in a way that the positioning holes surrounds the positioning protrusions to form a gap fit. In particular, the magnet 23 is fixed on a gluing position of the long side wall 221 on the same side to realize the precise positioning between the magnet 23 and the long side wall 2211, and the magnet 23 is fixedly connected to the gluing position of the long side wall 221. The magnet 23 can be directly glued with the long side wall 221.

Through the setting of the positioning protrusions 220, during the assembly process, the positioning protrusions 220 are directly surrounded by the positioning holes 230 so that the magnet 23 is located in the gluing position, which realizes the accurate positioning of the magnet 23, improves the assembly accuracy, and eliminates the alignment work between the magnet 23 and the pole plate 22, reduces the assembly difficulty and makes the assembly simple. Meanwhile, the positioning protrusion 220 provides the magnet 23 with support, which makes the assembly of the magnet 23 and the pole plate 22 more reliable, avoids the phenomenon of falling off of the magnet 23 in the process of vibration, so that the vibration reliability of the linear vibration motor 100 is high.

It should be noted that each of the positioning protrusions 220 and the positioning holes 230 has rectangular a cross-section with round corners, taken along the long axis of the body part 221. The positioning protrusion is a rectangle with round corners, and the positioning hole is also a rectangle with round corners. Compared with the normal rectangle, the rectangle with round corners is capable of restricting the relative rotation between the positioning protrusion and the positioning hole, which makes the engagement between the positioning protrusion and the positioning hole more stable, and improves the stability of the vibration. Of course, the shape of the positioning protrusion and the positioning hole is not limited to what is described in the embodiment, and the shapes thereof can be adjusted according to actual requirement.

Figure 5:
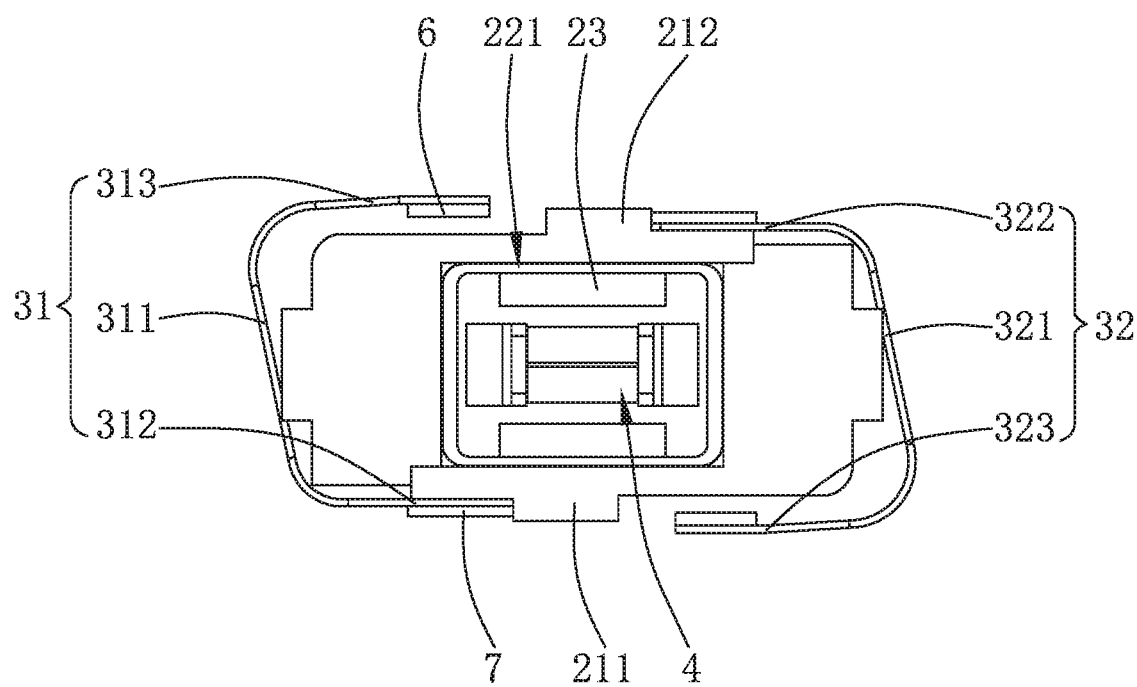
FIG. 5 is a partially assembled view of the linear vibration motor.

As shown in FIG. 2 and FIG. 5, the elastic member 3 suspends the vibration unit 2 in the accommodation space 10. One end of the elastic member 3 is fixed to the vibration unit 2, the other end is fixed to the housing 1, in particular to the upper cover 12 of the housing 1, and the vibration unit 2 is suspended in the upper cover 12.

In the embodiment, the elastic member 3 includes a first elastic member 31 and a second elastic member 32 respectively arranged on opposite sides of the weight 21 along the vibration direction. The arrangement of the double elastic member structure can make the vibration effect of the linear vibration motor 100 more balanced and the reliability better.

The first elastic member 31 includes a first elastic arm 311, a pair of first fixed arms 312 extending from both ends of the first elastic arm 311 in the same direction, and a first connecting arm 313. The first fixing arm 312 is fixed on the first wall 211, the first spring arm 311 is arranged spaced from the weight 21, and the first connecting arm 313 is fixed on one side of the housing 1 opposite to the second wall 212.

The second elastic member 32 includes a second elastic arm 321, a pair of second fixed arms 322 extending from both ends of the second elastic arm 321 in the same bending direction, and a second connecting arm 323. The second fixing arm 322 is fixed on the second wall 212, the second spring arm 321 is arranged spaced from the weight 21, and the second connecting arm 323 is fixed on the side opposite to the first wall 211 of the housing 1. In the structure, the first elastic member 31 and the second elastic member 32 clamp and suspend the vibration unit 2 in the accommodation space 10 to provide the vibration conditions for the vibration unit 2.

More preferably, in order to enhance the fixing strength of the elastic member 3, the linear vibration motor 100 also includes at least two first reinforcing blocks 6 and two second reinforcing blocks 7.

One of the first reinforcing blocks is located on the side near the second wall 212 of the first connecting arm 313 and fixed on the housing 1; the other is located on the side near the first wall 211 of the second connecting arm 323 and fixed on the housing 1.

Two second reinforcing blocks 7 are respectively located on one side of the first fixing arm 312 and the second fixing arm 322 close to the housing 1. The two second reinforcing blocks 7 fix the first fixing arm 312 and the second fixing arm 322 on the first wall 211 and the second wall 212 respectively.

As shown in FIGS. 2-3, the coil assembly 4 is fixed on the housing 1 and drives the vibration unit 2 to vibrate. In the embodiment, the coil assembly 4 is fixed on the bottom plate 11.

Specifically, the coil assembly 4 includes an iron core 41 fixed to the housing 1 and a coil 42 wound around the iron core 41.

In the embodiment, the coil assembly 4 is fixedly installed on the bottom plate 11, which is arranged at an interval opposite to the two magnets 23. After the coil 42 is electrified, the iron core 41 forms a magnetic field and interacts with the magnetic field of the magnets 23, so as to drive the vibration unit 2 to move towards a compound straight line and produce a vibration effect.

Compared with related technologies, in the linear vibration motor provided by the present disclosure, the pole plate includes a body and a positioning protrusion extending from the body toward the coil assembly. The magnet includes a positioning hole corresponding to the positioning protrusion. By the engagement between the positioning protrusion and the positioning hole, the magnet is fixed by the positioning protrusion surrounded by the positioning hole. During the assembly process, the cooperation between the positioning protrusion and the positioning hole directly fixes the magnets at the gluing position, which realizes the precise positioning of the magnets, improves the assembly accuracy, and eliminates the alignment between the magnets and the pole plate, reduces the assembly difficulty and makes the assembly simple. At the same time, the positioning protrusion provides the magnets with support, and makes the assembly of the magnets and the pole plate more reliable, and avoids the phenomenon that the magnets falls off during the vibration process, thus making better reliability of the linear vibration motor.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, including:
a housing with an accommodation space;
an elastic member in the accommodation space;
a vibration unit suspended in the accommodation space by the elastic member, including a weight with a through hole connected to the elastic member, a pole plate fixed in the through hole, and a magnet fixed to the pole plate;
a coil assembly for driving the vibration unit to vibrate, inserted in the through hole and spaced apart from the magnet;
wherein
the pole plate includes a body part fixed with the weight and a pair of positioning protrusions extending from two ends of the body part toward the coil assembly; and the magnet includes a pair of positioning holes corresponding to the positioning protrusions, so that the magnet is fixed by an engagement between the positioning protrusions and the positioning holes, the body part of the pole plate is a rectangle having a long axis parallel to a vibration direction; the body part includes two long side walls parallel to a long axis direction thereof and two short side walls parallel to a short axis direction thereof, the long side walls extend parallel to the vibration direction, and the positioning protrusions extend from the long side walls, the positioning protrusions and the positioning holes both have rectangular with round corners cross-sections taken along the long axis direction of the body part.

2. The linear vibration motor as described in claim 1, wherein, the housing comprises a bottom plate and an upper cover engaging with the bottom plate for enclosing the accommodation space; the elastic member is fixed on an inner side of the upper cover; the vibration unit is suspended in the upper cover, and the coil assembly is fixed on the bottom plate.

3. The linear vibration motor as described in claim 1, wherein, the weight includes a first wall and a second wall parallel to the long side walls; the elastic member includes a first elastic member and a second elastic member disposed at two sides of the weight along the vibration direction; the first elastic member includes a first elastic arm, a pair of first fixing arms extending from two ends of the first elastic arm in a same direction, and a first connecting arm; the first fixing arms are fixed on the first wall, the first elastic arm is arranged spaced from the weight, and the first connecting arm is fixed on one side of the housing opposite to the second wall; the second elastic member includes a second elastic arm, a pair of second fixing arms extending from two ends of the second elastic arm in a same bending direction, and a second connecting arm; the second fixing arms are fixed on the second wall, the second elastic arm is arranged spaced from the weight, and the second connecting arm is fixed on a side of the housing opposite to the first wall of the weight.

4. The linear vibration motor as described in claim 3, further including at least two first reinforcing blocks, one of the first reinforcing blocks is located on a side of the housing near the second wall of the weight and fixed on the housing; the other of the first reinforcing blocks is located on a side of the housing near the first wall of the weight and fixed on the housing.

5. The linear vibration motor as described in claim 4, further including at least two second reinforcing blocks respectively located on a side of the first fixing arms and the second fixing arms close to the housing; the two second reinforcing blocks fix the first fixing arms and the second fixing arms on the first wall and the second wall respectively.

* * * * *